US006970598B1

(12) United States Patent
Nagarajan et al.

(10) Patent No.: US 6,970,598 B1
(45) Date of Patent: Nov. 29, 2005

(54) DATA PROCESSING METHODS AND DEVICES

(75) Inventors: Ramesh Nagarajan, Fairport, NY (US); Julie A. Fisher, Rochester, NY (US); Charles E. Farnung, Rochester, NY (US); Francis K. Tse, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 690 days.

(21) Appl. No.: 09/488,572

(22) Filed: Jan. 21, 2000

(51) Int. Cl.[7] .................................................. G06K 9/34
(52) U.S. Cl. ........................................................ 382/173
(58) Field of Search ......... 382/173–180; 358/450–464

(56) References Cited

U.S. PATENT DOCUMENTS

| | | | | |
|---|---|---|---|---|
| 5,339,172 A * | 8/1994 | Robinson | .................... | 358/462 |
| 5,850,490 A * | 12/1998 | Johnson | ...................... | 382/306 |
| 6,167,156 A * | 12/2000 | Antoniades et al. | ........ | 382/232 |
| 6,246,783 B1 * | 6/2001 | Avinash | ...................... | 382/260 |

* cited by examiner

*Primary Examiner*—Jingge Wu
(74) *Attorney, Agent, or Firm*—Oliff & Berridge, PLC

(57) ABSTRACT

For segmenting an image, a segmentation mode is selected by a user. If the segmentation mode is the automatic segmentation mode, the user is allowed to input a new value for automatic segmentation parameters. Thus, the image is segmented using the automatic segmentation parameter values, including any new automatic segmentation parameter values.

9 Claims, 6 Drawing Sheets

FIG. 3
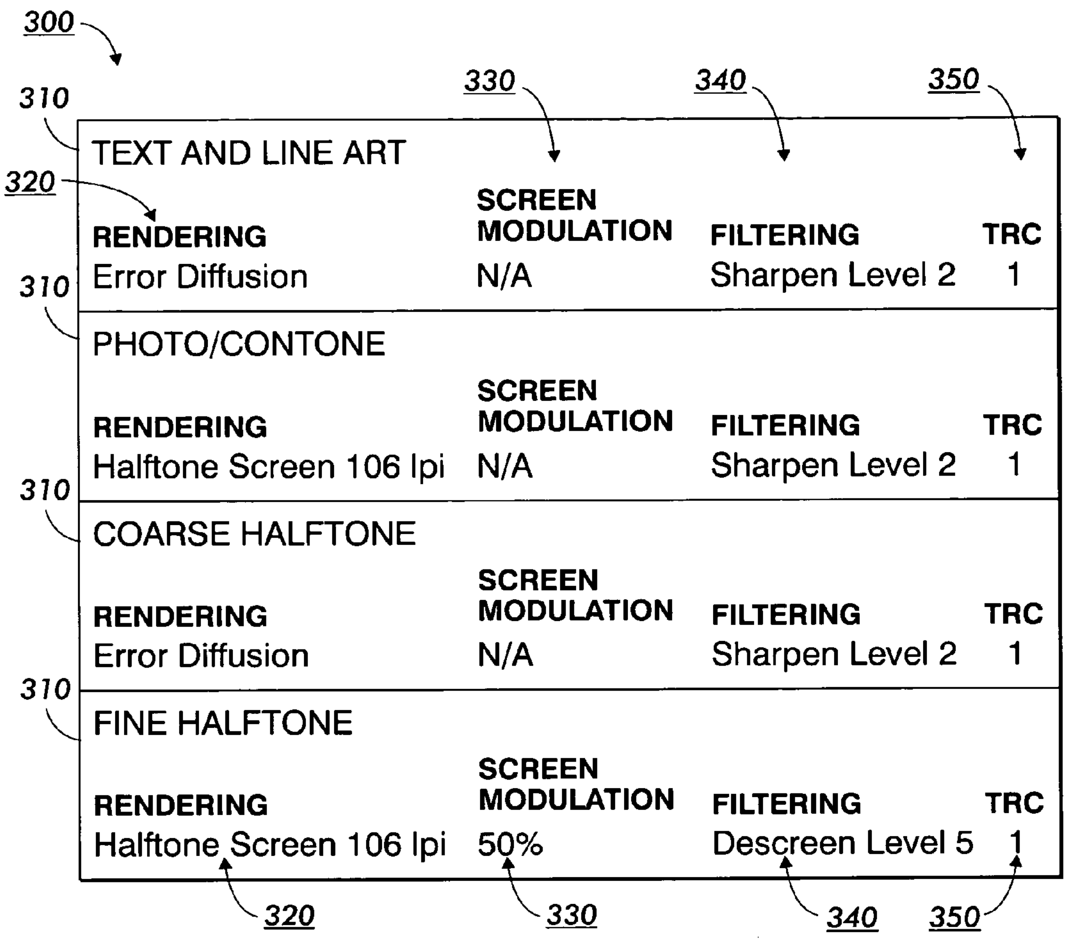
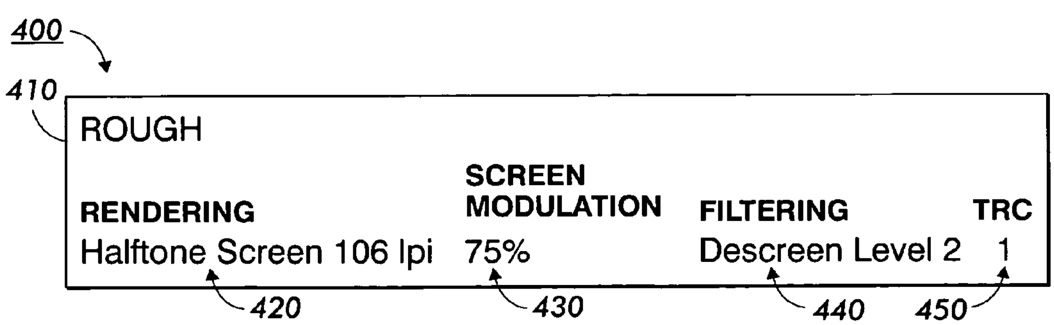
FIG. 4

DATA PROCESSING METHODS AND DEVICES

BACKGROUND OF THE INVENTION

1. Field of Invention

The invention relates to data processing methods and devices.

2. Description of Related Art

The segmentation of an image is the division of the image into portions or segments that are independently processed. For example, some segments may relate to text and other segments may relate to images. The segments that relate to text will be processed to improve the rendering of high contrast. In contrast, the segments that relate to images will be processed to improve the rendering of low contrast.

Conventionally, the settings or parameters relating to each segment class in an automatic mode are predetermined. The user of a scanner or copier system implementing a segmentation mode is not allowed to change the automatic mode settings or parameters. The settings relating to the tone reproduction curves (TRCs), the filters, and/or the rendering methods are fixed for the automatic segmentation mode.

SUMMARY OF THE INVENTION

However, for various reasons, a user could be interested in adjusting the automatic mode settings and parameters, for example to conform a specific rendering of data to his own esthetic choices.

The data processing methods and devices according to this invention allow a user to change data processing settings in a segmentation mode.

In exemplary embodiments, when selecting an automatic segmentation mode for processing an image, the user will have the flexibility to change all data processing settings (tone reproduction curve, filter and rendering method) for certain types of segments. The image will then be processed with the user-specified settings.

Moreover, in particular exemplary embodiments, data processing settings for some of the segment classes are calculated based on the settings specified by the user.

These and other features and advantages of this invention are described in or are apparent from the following detailed description of the systems and methods according to this invention.

BRIEF DESCRIPTION OF THE DRAWINGS

Various exemplary embodiments of this invention will be described in detail, with reference to the accompanying drawings, wherein:

FIGS. 3 and 4 show portions of a table of settings used in exemplary embodiments of the data processing methods and devices according to this invention;

DETAILED DESCRIPTION OF PREFERRED EMBODIMENTS

Figure 1:
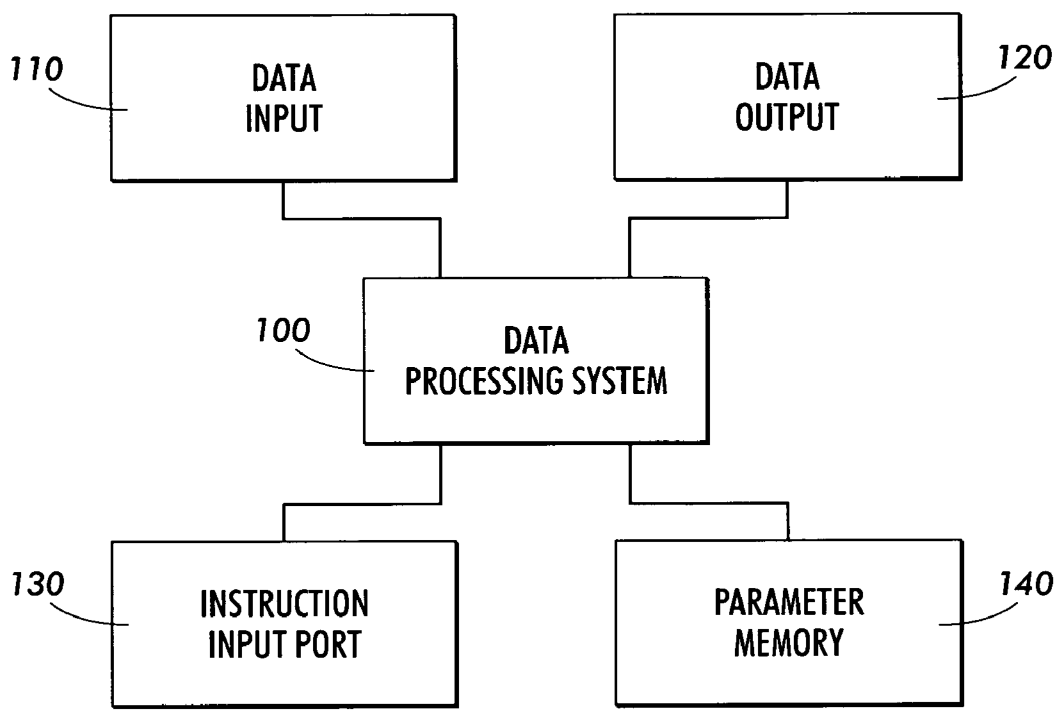
FIG. 1 is a functional block diagram outlining a first exemplary embodiment of the data processing devices according to this invention.

FIG. 1 is a functional block diagram outlining a first exemplary embodiment of the data processing devices 100 according to this invention. As shown in FIG. 1, the data processing device 100 is connected to a data input circuit 110, a data output circuit 120, an instruction input port 130 and a parameter memory 140. The data processing system 100 can be a computer or any other known or later developed system capable of segmenting data received from the data input circuit 110 into data segments, independently processing each data segment according to segmentation parameters stored in the parameter memory 140, and outputting the processed data to the data output circuit 120. The data processing device 100 also receives instruction from the instruction input port 130 and stores automatic segmentation parameters in the parameter memory 140.

The data input circuit 110 can be connected to one or more of a storage device, such as a hard disk, a compact disk, a diskette, an electronic component, a floppy disk, or any other known or later developed system or device capable of storing data; or a telecommunication network, a digital camera, a scanner, a sensor, a processing circuit, a locally or remotely located computer, or any known or later developed system capable of generating and/or providing data.

The data output circuit 120 can be one or more of a printer, a network interface, a memory, a display circuit, a processing circuit or any known or later developed system capable of handling data.

The instruction input port 130 allows the data processing system 100 to receive parameters instructions relating to automatic segmentation mode parameters stored in the parameter memory 140. The instruction input port 130 can be coupled to one or more of a keyboard, a mouse, a touch screen, a touch pad, a microphone, a network, or any other known or later developed circuit capable of inputting data.

In operation, the data processing system 100 receives instructions at the instruction input port 130. The received instructions relate to data processing sequences to be performed on one or more of defined sets of data received at the data input circuit 110. For example, a defined set of data can correspond to one or more of an image, a document, a file or a page.

Each data processing sequence refers to an operating mode of the data processing system 100. For example, in a uniform operating mode, the data processing system uniformly processes each data of an image using the same parameter values, while in a semi-automatic operating mode, the data processing system performs a succession of processing steps and the user is asked to validate the result of each of those steps before the next processing step is performed. In contrast, in an automatic segmentation mode which is discussed in greater detail below, the data processing system 100 divides a defined set of data into portions or segments and each segment is independently processed using different parameters. For example, for image processing, segments may correspond to one of the following classes: text and line, contone, coarse halftone and fine halftone.

Occasionally, a segment class has one or more predetermined relationships with one or more other segment classes. For example, a segment class may correspond to an intermediate class between two other segment classes. The data processing system 100 stores the parameter instructions and the relationships between segment classes in the parameter memory 140.

Using the parameter values stored in the parameter memory 140, the data processing system 100 independently process segments of each class of segment and outputs the result of each of the data processing sequence to the data output circuit 120.

When parameter instructions are received by the data processing system 100, the parameter instructions refer to one or more of defined operating modes of the data processing system 100 and to one or more of the segment classes used in segmentation modes.

If the data processing system 100 determines that there is at least one defined set of data to be processed and that an operating mode is assigned to the processing of at least one defined sets of data, the data processing system 100 reads the parameter values corresponding to this operating mode and begins processing the defined set of data using the assigned operating mode. As long as all the defined sets of data to which an operating mode has been assigned have not been completed, the data processing system 100 continues processing those defined sets of data.

However, the data processing device 100 allows a user to provide one or more instructions to set the parameter values for an automatic segmentation mode. When the data processing system 100 receives an instruction indicating that the user wishes to set the parameters values for an automatic segmentation mode, the data processing system 100 receives the new parameters values from the user via the instruction input port 130. The data processing system 100 then stores the new parameter values based on the received parameter instructions, in the parameter memory 140.

In various exemplary embodiments of the data processing systems of this invention, the data processing system 100 receives parameters instructions for a subset of the set of segment classes. The classes of this subset are called the main classes. The remaining classes of the set of classes are called the subclasses or the intermediate classes. The parameter values for the subclasses have a relationship with one or more of the parameter values of one or more main class. In these exemplary embodiments, the data processing system 100 determines the parameter values of the subclasses based on the received parameter values for the main classes. This operation may be performed either after the parameter values relating to the main classes have been entered by the user. In this case, the parameter values for the subclasses are stored in the parameter memory 140. Alternatively, this operation may be delayed until the automatic segmentation mode has been selected for a defined set of data and parameter values for the main classes have to be stored in the parameter memory 140. In this latter case, the subclasses parameter values are not stored in the parameter memory 140.

Figure 2:
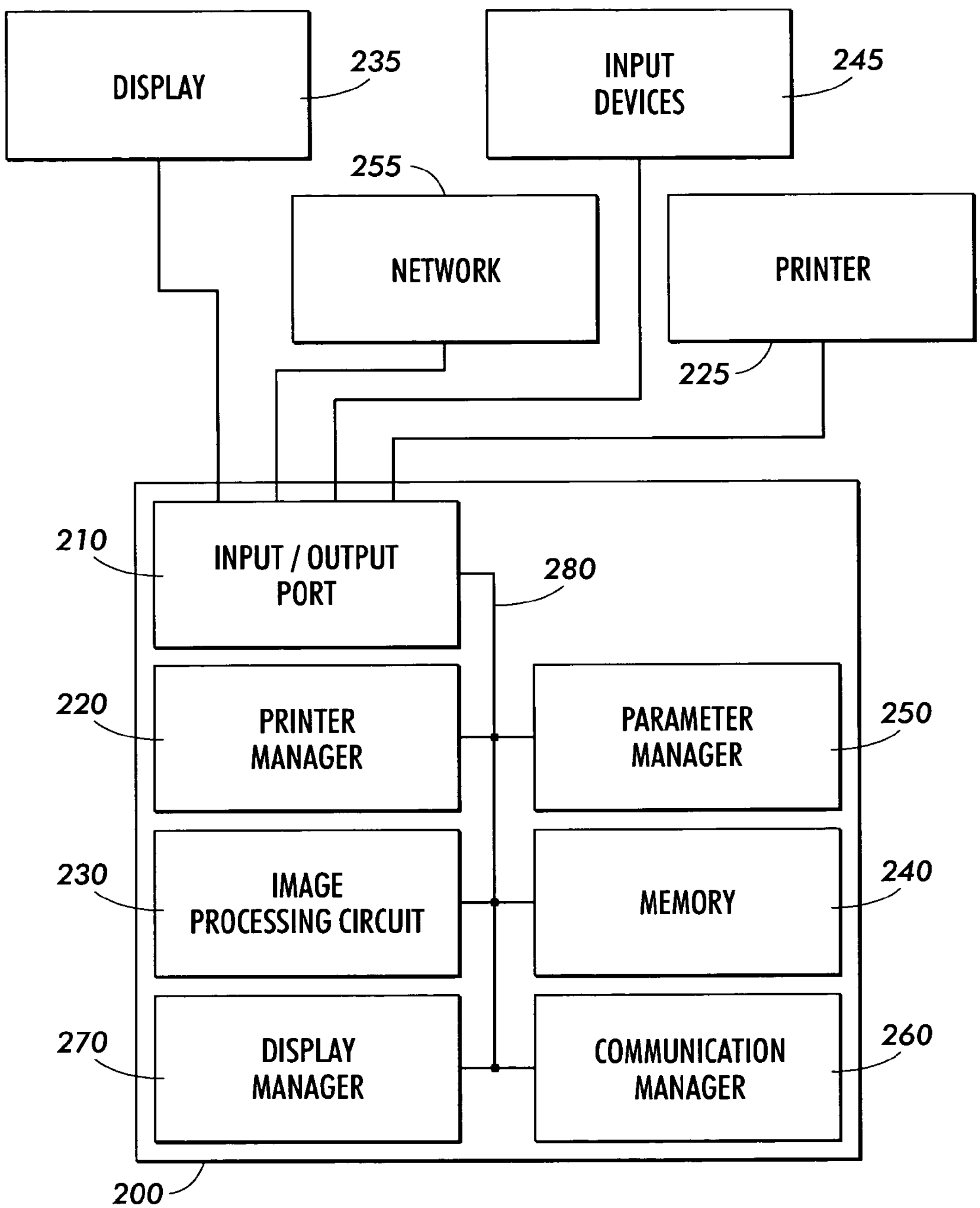
FIG. 2 is a functional block diagram outlining a second exemplary embodiment of the data processing devices according to this invention.

FIG. 2 is a functional block diagram outlining a second exemplary embodiment of the data processing devices according to this invention. As shown in FIG. 2, a data processing system 200 comprises at least some of an input/output port 210, a printer manager 220, an image processing circuit 230, a memory 240, a parameter manager 250, a communication manager 26Q and a display manager 270, each connected together by a data/control bus 280.

The input/output port 210 is connected to one or more of a printer 225, a display 235, one or more input devices 245 and a network 255. The input/output port 210 receives data from one or more of the one or more input devices 245 and the network 255 and transmits the received data to the data/control bus 280. The input/output port 210 also receives data from the data/control bus 280 and transmits that data to at least one of the printer 225, the display 235, the one or more input devices 245 and the network 255.

The printer manager 220 drives the printer 225. For example, the printer manager 220 can drive the printer 225 to print images, files or documents stored in the memory 240. The image processing circuit 230 performs image processing, and includes at least an automatic segmentation mode in which an image is divided into segments relating to segment classes and the segments are independently processed based on the segment class to which they belong. The memory 240 stores defined parameter values for at least a subset of the set of segment classes. The parameter manager 250 allows a user to control the parameter settings for an automatic segmentation mode used by the data processing system 200 to process one or more of the defined sets of data received from one or more of the input devices 245 or the network 255. The parameter manager 250 also controls the relationship between parameter values of subclasses based on the parameter values of main classes for the automatic segmentation mode.

The communication manager 260 controls the transmission of data to and the reception of data from the network 255. The display manager 270 drives the display 235.

In operation, a user can provide instructions through either one or both of the one or more input devices 245 and the network 255. The user can provide a request for setting new values for one or more parameters used in the automatic segmentation operating mode. When the user provides this request, the parameter manager 250 searches the current parameter values for the main classes in the memory 240. Thus, the display manager 270 displays the current parameter values using, for example, one or more graphical user interfaces.

The user thus provides at least one new parameter value for one or more of the parameters relating to one or more of the main classes. Each new parameter value is input by one of the input devices 245 or the network 255. The parameter manager 250 stores the new parameter values in the memory 240.

Next, either after the new parameter values have been stored in the memory 240 or upon a defined set of data to be processed by using the automatic segmentation mode being received, the parameter manager 250 determines the parameter values of one or more parameter relating to one or more subclass based on parameter values of parameters relating to one or more main class.

It should be appreciated that each input device 245 can be connected to one or more of a storage device, such as a hard disk, a compact disk, a diskette, an electronic component, a floppy disk, or any other known or later developed system or device capable of storing data; or a telecommunication network, a digital camera, a scanner, a sensor, a processing circuit, a locally or remotely located computer, or any known or later developed system capable of generating and/or providing data.

FIGS. 3 and 4 show portions of a table of settings used in exemplary embodiments of the data processing methods and devices according to this invention.

There are 4 main segmentation classes, Text and Line Art, Photo/Contone, Coarse Halftone and Fine Halftone. There are 4 parameters that need to be set for each of the 4 main classes, rendering method, filtering, tone reproduction curve and screen modulation. In the Text and Line Art class, the user has two choices for the rendering method, error diffusion and thresholding. Error diffusion is a binarization method that tries to preserve the average graylevel of an image within a local area by propagating the error generated during binarization to pixels that are yet to be processed.

The filtering method can be chosen to be either sharpen or descreen. The sharpness or descreen level value is chosen by the user. The user can select any one of 4 tone reproduction curves for the Text and Line Art class segment. The 4 tone reproduction curve choices include high contrast, medium-high contrast, medium contrast and low contrast. The screen modulation setting is used in conjunction with the hybrid screen rendering method and therefore does not apply for the Text and Line Art class.

In the Photo/Contone class, the user has three choices for the rendering method, error diffusion, hybrid screen and pure halftoning. In the hybrid screen method, the input image data is first modulated with the screen data and an error diffusion method is applied to the data resulting data from the first modulation. When 100% of the screen is applied for modulating the input data, the hybrid screen method is very close to pure halftoning. When 0% of the screen is applied, the hybrid screen method exactly matches the output of error diffusion.

The filtering method can be chosen to be either sharpen or descreen. The sharpness or descreen level value is chosen by the user. The user can select any one of 4 tone reproduction curves for the Photo/Contone class segment. The four tone reproduction curve choices include high contrast, medium-high contrast, medium contrast, low contrast. The screen modulation setting is used in conjunction with the Hybrid screen rendering method only. The screen modulation setting allows the user to choose a setting between 100% and 0%. The screen modulation setting indicates the relative percentages of error diffusion and halftone to be used in the hybrid screen rendering method.

In the coarse halftone class, the user has four choices for rendering method, error diffusion, hybrid screen, pure halftoning and thresholding. The filtering method can be chosen to be either sharpen or descreen. The sharpness or descreen level value is chosen by the user. The user has the option of selecting any one of four tone reproduction curves for the Coarse Halftone class segment. The four tone reproduction curve choices include high contrast, medium-high contrast, medium contrast, low contrast. Again, the user can set the value for the screen modulation setting when the hybrid screen rendering method is selected.

In the Fine Halftone class, the user has three choices for the rendering method, error diffusion, hybrid screen and halftone screen. The filtering method can be chosen to be either sharpen or descreen. The sharpness or descreen level value is chosen by the user. The user has the option of selecting any one of four tone reproduction curves for the Fine Halftone class segment. The four tone reproduction curve choices include: high contrast, medium-high contrast, medium contrast, low contrast. Again, the user can set the value for the screen modulation setting when the hybrid screen rendering method is selected.

Table 1 illustrates one exemplary embodiment of the autosegmentation mode default settings. In Table 1, the image processing parameter settings are shown for each main segmentation class.

TABLE 1

| Rendering Method | Text & Line Art Error Diffusion | Photo/Contone Pure Halftone | Coarse Halftone Error Diffusion | Fine Halftone Pure Halftone |
|---|---|---|---|---|
| Screen Modulation | N/A | N/A | N/A | N/A |
| Sharpen Filter | ON | ON | ON | OFF |
| Descreen Filter | OFF | OFF | OFF | ON |
| Sharpen level | 2 | 2 | 2 | N/A |
| Descreen Level | N/A | N/A | N/A | 5 |
| Halftone Screen | N/A | 106 lpi | N/A | 106 lpi |
| Reduce Moire | OFF | OFF | OFF | OFF |
| TRC | 1 | 1 | 1 | 1 |

In the auto-segmentation mode, there are a total of 30 segmentation classes, classes 0 through 29. All classes except for the four main classes are considered "intermediate" classes. The image processing settings for the intermediate classes are determined on-the-fly by interpolation between the settings of the main classes. In various exemplary embodiments, the settings for each intermediate class are determined linearly between the settings of that intermediate class's nearest main classes.

As shown in FIG. 3, a portion 300 of a graphical user interface usable to display and modify the values for the main segmentation classes comprises segment class identifiers 310, rendering method identifiers 320, screen modulation identifiers 330, filtering identifiers 340 and tone reproduction curve identifiers 350.

For the "Text and Line Art" segment class 310, the rendering method identifiers 320 is "error diffusion", the screen modulation identifier 330 is non applicable because hybrid screen is not seleceted as the rendering method, the filtering identifiers 340 is "sharpen level 2", indicating that the sharpen filter is used and that the sharpen level of the sharpen filter is "2", and the tone reproduction curve identifier 350 is "1".

For the "Photo/Contone" segment class 310, the rendering method identifiers 320 is "halftone screen 106 ipi", indicating that the rendering method is a pure halftoning method that uses an halftone screen having a 106 lines per inch definition. In the pure halftoning method, each gray level, over a given area, is compared to one of a set of distinct preselected thresholds and a binary output is generated. The set of thresholds comprises a matrix of threshold values or a halftone screen. For the "Photo/Contone" segment class 310, the screen modulation identifier 330 is "N/A", the filtering identifiers 340 is "sharpen level 2" and the tone reproduction curve identifier 350 is "1".

For the "Coarse Halftone" segment class 310, the rendering method identifiers 320 is "error diffusion", the screen modulation identifier 330 is non applicable because hybrid screen is not selected as the rendering method, the filtering identifiers 340 is "sharpen level 2", and the tone reproduction curve identifier 350 is "1".

For the "Fine Halftone" segment class 310, the rendering method identifiers 320 is "halftone screen 106 1 pi", indicating that the rendering method is a pure halftoning method that uses an halftone screen having a 106 lines per inch definition, the screen modulation identifier 330 is "50%", the filtering identifiers 340 is "sharpen level 2" and the tone reproduction curve identifier 350 is "1".

As shown in FIG. 4, a portion 400 of a table of settings that relates to subclasses comprises a segment subclass identifier 410, a rendering method identifier 420, a screen modulation identifier 430, filtering identifiers 440 and a tone reproduction curve identifier 450.

The segment subclass 410 shown in FIG. 4 is a "Rough" segment class which is an intermediate class between the main classes "Photo/Contone" and "Fine Halftone". Thus each parameter value is set to be an intermediate value between the corresponding parameter values of those main classes.

Thus, for the "Rough" segment class 410, the rendering method identifiers 320 is "halftone screen 106 1 pi", indicating that the rendering method uses an halftone screen having a 106 lines per inch definition. The screen modulation identifier 330 is "75%" for the Rough subclass, because 75% is the average value between the screen modulation values for the Photo/Contone class and the Fine Halftone subclass. The filtering identifiers 340 is "descreen level 2" since descreen level 2 is an average value between the filtering values for the Photo/Contone and the Fine Halftone classes. The tone reproduction curve identifier 350 is "1".

In the exemplary embodiment shown in FIGS. 3 and 4, the user is provided with the four main segmentation classes in the system, "Text & Line Art", "Photo/Contone", "Coarse Halftone" and "Fine Halftone". The user is given the option of changing the rendering method, the screen modulation, the filtering and the tone reproduction curve (TRC) which will be used to process segments of defined sets of data, for each of the four main segmentation classes.

The subclasses are classes that are used to transition between the four main classes. For example, the user-specified rendering method parameter values for the text class will be used as the starting point for slowly transitioning the rendering method across some of the subclasses, to the user-specified rendering method for the coarse halftone class. Filter weightings will be slowly changed in order to transition from one main class filter parameter value to the neighboring main class filter parameter value.

Likewise, each of the possible two tone reproduction curve selections will be weighted as the classes transition from one main class to the neighboring main class. In this way, automatic segmentation mode parameter values can be changed by the user without introducing abrupt visual transitions between segmentation classes. This also provides ease of use, in addition to flexibility for the user, since the user will not have to have advanced knowledge about each of the segmentation subclasses in order to take advantage of the advanced data processing features of the system.

Table 2 illustrates another exemplary relationship between subclasses and mains classes. Two main classes, Coarse Halftone and Fine Halftone are represented in Table 2. Two subclasses, Fuzzy low and Fuzzy high, that are intermediate between that two main classes are represented in Table 2.

TABLE 2

| Rendering Method | Coarse Halftone Error Diffusion | Fuzzy Low Hybrid Screen | Fuzzy High Hybrid Screen | Fine Halftone Pure Halftone |
|---|---|---|---|---|
| Screen Modulation | 0% | 33% | 67% | 100% |
| Sharpen Filter | ON | OFF | OFF | OFF |
| Descreen Filter | OFF | OFF | ON | ON |

TABLE 2-continued

| Rendering Method | Coarse Halftone Error Diffusion | Fuzzy Low Hybrid Screen | Fuzzy High Hybrid Screen | Fine Halftone Pure Halftone |
|---|---|---|---|---|
| Sharpen level | 2 | N/A | N/A | N/A |
| Descreen Level | N/A | N/A | 3 | 5 |
| Reduce Moire | OFF | OFF | OFF | OFF |
| TRC Weighting between 1 and 2 | 100% TRC 1 | 67% TRC 1, 33% TRC 2 | 33% TRC 1 67% TRC 2 | 100% TRC 2 |

In the exemplary relationship shown in Table 2, the hybrid screen method is used as the rendering method for the subclasses that are intermediate between a main class whose rendering method is error diffusion and a main class whose rendering method is pure halftoning. The screen modulation percentages for the hybrid screen methods are 33 and 66%, i.e., equally spaced apart from each other and from the screen modulation percentages for the main classes. The tone reproduction curve for each intermediate class is a weighted average between the tone reproduction curves of the corresponding main classes.

Figure 5:
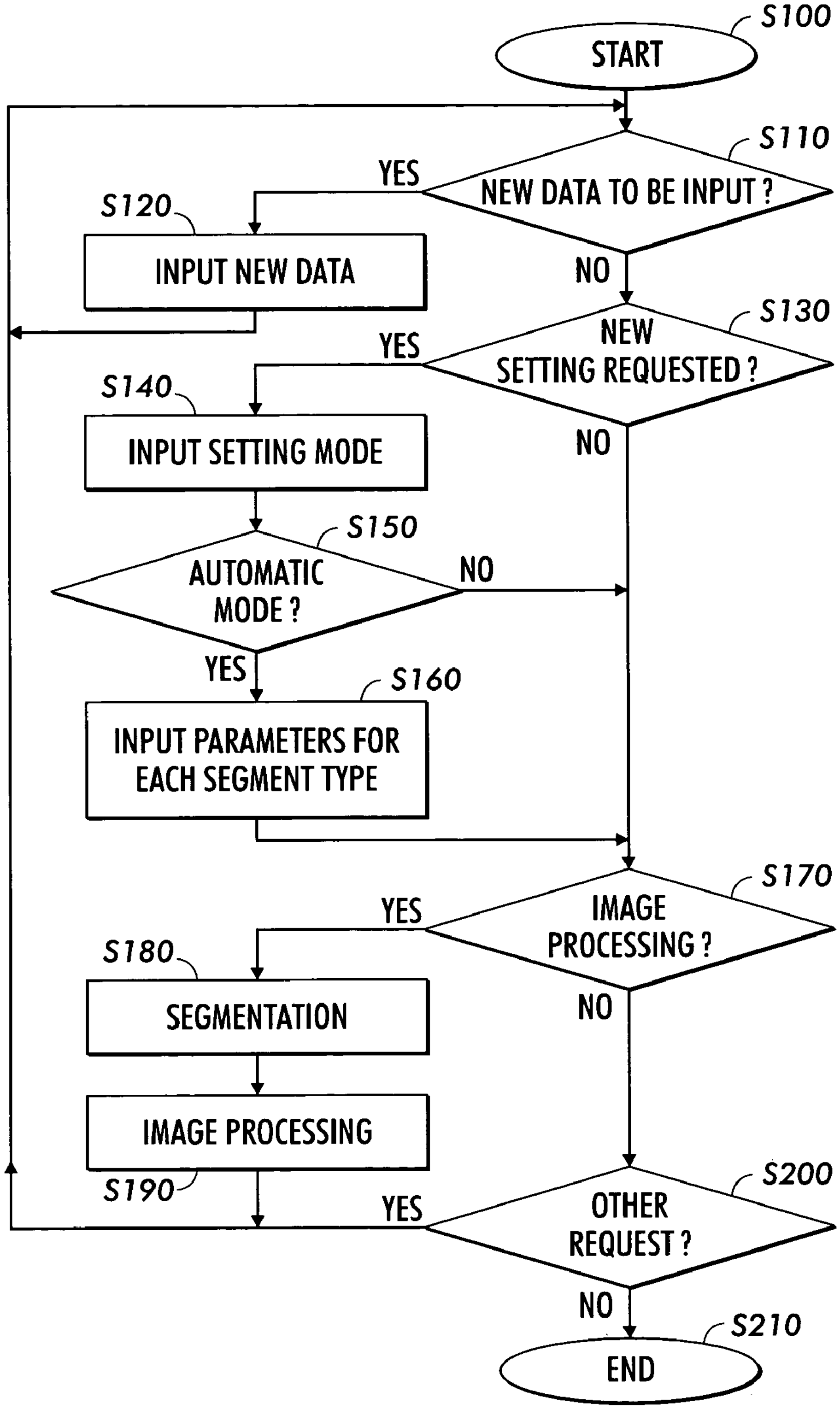
FIG. 5 is a flowchart outlining a first exemplary embodiment of a data processing method according to this invention.

FIG. 5 is a flowchart outlining a first exemplary embodiment of a data processing method according to this invention. Beginning in step S100, control continues to step S110, where a determination is made whether a new set of data is input. If so, control continues to step S120. Otherwise, control jumps to step S130. In step S120, the sets of data to be input are input. Control then jumps back to step S110. In step S130, a determination is made whether a new setting is requested. If so, control continues to step S140. Otherwise, control jumps to step S170.

In step S140, the mode to which the new setting refers is input. Next, in step S150, a determination is made whether the input mode is an automatic segmentation mode. If so, control continues to step S160. Otherwise, control jumps to step S170.

In step S160, the parameters of segment classes used in the automatic segmentation mode are input. Control then continues to step S170.

In step S170, a determination is made whether an image processing under the selected segmentation operating mode is requested. That is, a determination is made whether a defined set of data for which the selected segmentation mode has been assigned can be processed. If so, control continues to step S180. Otherwise, control jumps to step S200. In step S180, the defined set of data to be processed is segmented using the selected segmentation mode. In particular, if the automatic segmentation mode is selected, the defined set of data is automatically segmented using the parameters values for the classes input in step S160. Next, in step S190, each segment of the defined set of data is independently processed using the parameter values of the segment class to which the segment belongs. Control then continues to step S200.

In step S200, a determination is made whether there are any other data or instructions to process. If so, control jumps back to step S110. Otherwise, control continues to step S210, where the process ends.

Figure 6:
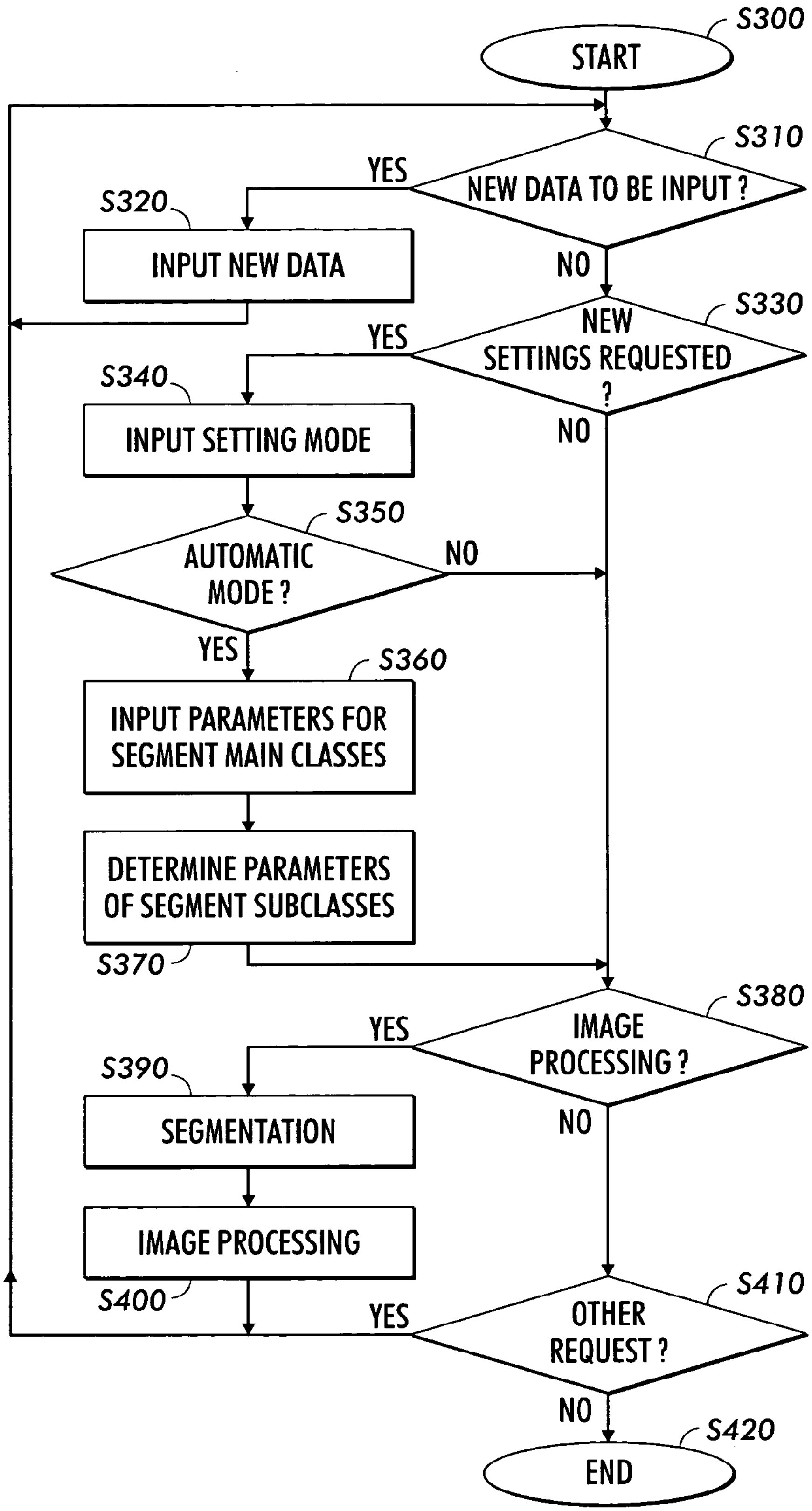
FIG. 6 is a flowchart outlining a second exemplary embodiment of a data processing method according to this invention.

FIG. 6 is a flowchart outlining a second exemplary embodiment of a data processing method according to this invention. Beginning in step S300, control continues to step S310, where a determination is made whether a new set of data is input. If so, control continues to step S320. Otherwise, control jumps to step S330. In step S320, the sets of data to be input are input. Control then jumps back to step S310. In step S330, a determination is made whether a new setting is requested. If so, control continues to step S340. Otherwise, control jumps to step S380.

In step S340, the mode to which the new setting refers is input. Next, in step S350, a determination is made whether the input mode is an automatic segmentation mode. If so, control continues to step S360. Otherwise, control jumps to step S380. In step S360, the parameters of segment main classes used in the automatic segmentation mode are input and stored. Then, in step 370, the parameter values of the segment subclasses are determined based on the corresponding parameter values of the segment main classes. The parameter values of the segment subclasses are also stored. Control then continues to step S380.

In step S380, a determination is made whether an image processing under the selected segmentation operating mode is requested. That is, a determination is made whether a defined set of data for which the selected segmentation mode has been assigned can be processed. If so, control continues to step S390. Otherwise, control jumps to step S410. In step S390, the defined set of data to be processed is segmented using the selected segmentation mode. In particular, if the automatic segmentation mode is selected, the defined set of data is automatically segmented using the parameters values for the main classes input in step S360 and the parameter values determined for the subclasses in step S370.

Next, in step S400, each segment of the defined set of data is independently processed using the parameter values of the segment class to which the segment belongs. Control then continues to step S410.

In step S410, a determination is made whether there are any other data or instruction to process. If so, control jumps back to step S310. Otherwise, control continues to step S420, where the process ends.

Figure 7:
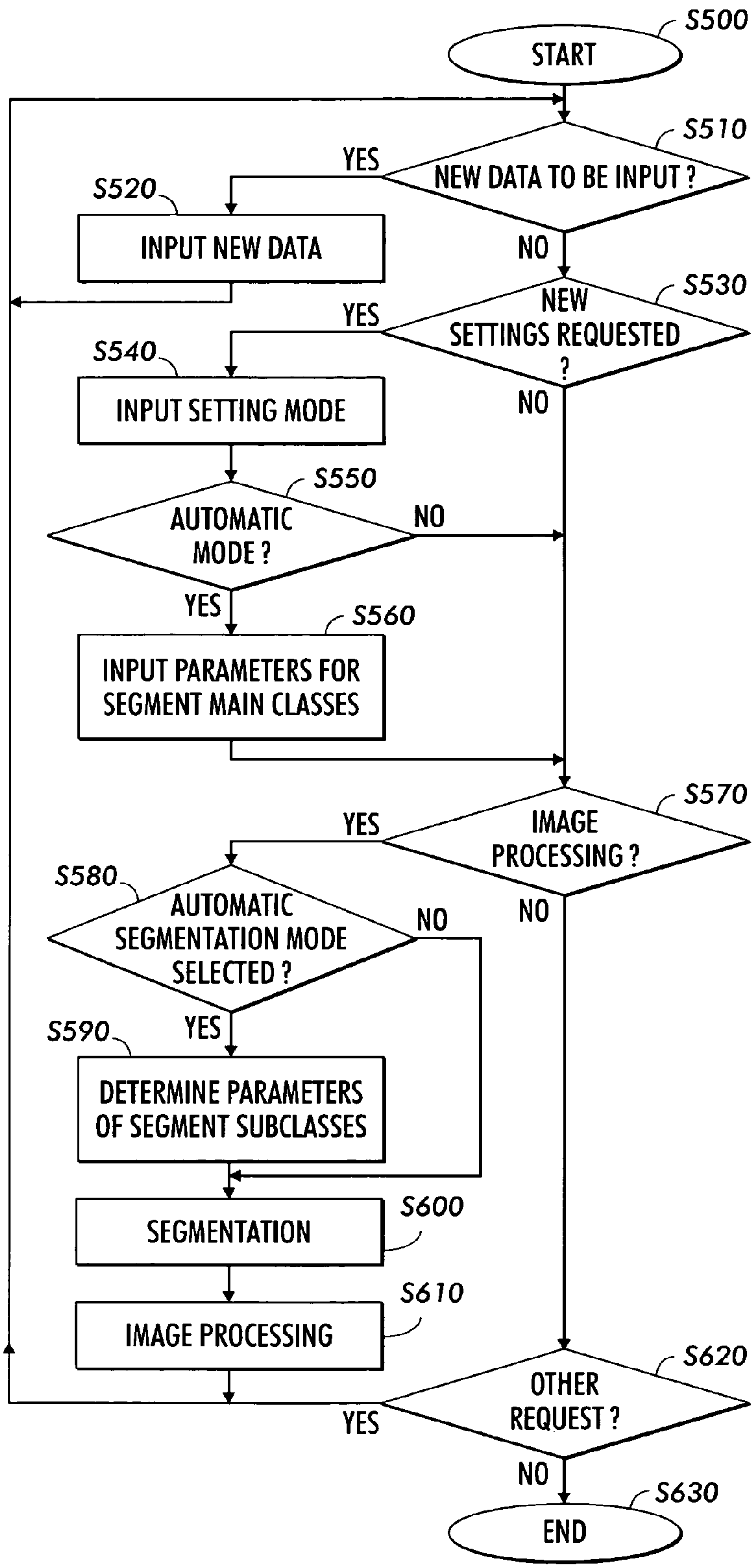
FIG. 7 is a flowchart outlining a third exemplary embodiment of a data processing method according to this invention.

FIG. 7 is a flowchart outlining a third exemplary embodiment of a data processing method according to this invention. Beginning in step S500, control continues to step S510, where a determination is made whether a new set of data is input. If so, control continues to step S520. Otherwise, control jumps to step S530. In step S520, the sets of data to be input are input. Control then jumps back to step S510. In step S530, a determination is made whether a new setting is requested. If so, control continues to step S540. Otherwise, control jumps to step S580.

In step S540, the mode to which the new setting refers is input. Next, in step S550, a determination is made whether the input mode is an automatic segmentation mode. If so, control continues to step S560. Otherwise, control jumps to step S570. In step S560, the parameters of segment main classes used in the automatic segmentation mode are input and stored. Control then continues to step S570.

In step S570, a determination is made whether an image processing using the selected segmentation mode selected in step S540 is requested. If so, control continues to step S580. Otherwise, control jumps to step S620. In step S580, a determination is made whether the selected segmentation mode is the automatic segmentation mode. If so, control continues to step S590. Otherwise, control jumps directly to step S600.

In step S590, the parameter values of the segment subclasses are determined, based on the corresponding parameter values of the segment main classes. In step S600, the defined set of data to be processed is segmented. Then, in step S610, each segment of the defined set of data is independently processed using the parameter values of the segment class to which the segment belongs. Control then continues to step S620.

In step S620, a determination is made whether there are any other data or instruction to process. If so, control jumps back to step S510. Otherwise, control continues to step S630, where the process ends.

As shown in FIGS. 1 and 2, the data processing system may be implemented on a programmed general purpose computer. However, the data processing system can also be implemented on a special purpose computer, a programmed microprocessor or microcontroller and peripheral integrated circuit elements, an ASIC or other integrated circuit, a digital signal processor, a hardwired electronic or logic circuit such as a discrete elements circuit, a programmable logic device such as a PLD, PLA, FPGA or PAL, or the like. In general, any device capable of implementing a finite state machine that is in turn capable of implementing one or more of the flowcharts shown in FIGS. 4–6, can be used to implement the data processing system.

Moreover, the data processing system can be implemented as software executing on a programmed general purpose computer, a special purpose computer, a microprocessor or the like. In this case, the data processing system can be implemented as a routine embedded in a printer driver, a scanner driver, a copier driver, as a resource residing on a server, or the like. The data processing system can also be implemented by physically incorporating it into a software and/or hardware system, such as the hardware and software systems of a printer, a scanner or a digital photocopier.

It should be understood that each of the circuits shown in FIGS. 1 and 2 can be implemented as portions of a suitably programmed general purpose computer. Alternatively, each of the circuits shown in FIGS. 1 and 2 can be implemented as physically distinct hardware circuits within an ASIC or other integrated circuit, a digital signal processor, a hardwired electronic or logic circuit such as a discrete elements circuit, a programmable logic device such as a PLD, PLA, FPGA or PAL, or using discrete circuit elements. The particular form each of the circuits shown in FIGS. 1 and 2 will take is a design choice and will be obvious and predictable to those skilled in the art.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for segmenting an image comprising:

determining a selected segmentation mode to be used when segmenting the image;

determining if the selected segmentation mode is an automatic mode;

determining, if the selected segmentation mode is the automatic mode, whether a user wishes to change at least one automatic segmentation parameter of the selected mode;

inputting a new value for each at least one automatic segmentation parameter to be changed, if the user wishes to change at least one automatic segmentation parameter; and segmenting the image using the automatic segmentation parameter values, including any new automatic segmentation parameter values.

2. The method of claim 1, further comprising altering, if at least one new automatic segmentation parameter value is input, at least one other automatic segmentation parameter value.

3. The method of claim 1, further comprising storing the at least one new automatic segmentation parameter value.

4. The method of claim 2, further comprising storing the at least one new automatic segmentation parameter value and the at least one other automatic segmentation parameter value.

5. The method of claim 2, further comprising storing the at least one new automatic segmentation parameter value and altering the at least one other automatic segmentation parameter value each time the automatic segmentation mode is selected.

6. A method for segmenting an image comprising:

determining a selected segmentation mode to be used when segmenting the image;

determining if the selected segmentation mode is an automatic mode;

determining, if the selected segmentation mode is the automatic mode, whether a user wishes to change at least one automatic segmentation parameter of the selected mode;

inputting a new value for each at least one automatic segmentation parameter to be changed, if the user wishes to change at least one automatic segmentation parameter; and segmenting the image using the automatic segmentation parameter values, including any new automatic segmentation parameter values;

altering, if at least one new automatic segmentation parameter value is input, at least one other automatic segmentation parameter value, wherein each one of the at least one automatic segmentation parameter to be changed correspond to a segmentation class in a first subset of a set of segmentation classes and each one of the at least one other automatic segmentation parameter value to be altered correspond to a segmentation class in a second subset of the set of segmentation classes.

7. The method of claim 6, wherein at least one segmentation parameter value of each class of the second subset is linked to at least one segmentation parameter value of a class of the first subset.

8. The method of claim 7, wherein at least one segmentation parameter value of each class of the second subset is derived from the at least one segmentation parameter value of a class of the first subset.

9. The method of claim 8, wherein at least one segmentation parameter value of each class of the second subset is a weighted average of the at least one segmentation parameter value of a class of the first subset.

* * * * *